United States Patent
Bavly et al.

(10) Patent No.: US 8,060,536 B2
(45) Date of Patent: Nov. 15, 2011

(54) MANAGING STRUCTURED AND UNSTRUCTURED DATA WITHIN ELECTRONIC COMMUNICATIONS

(75) Inventors: Guy Bavly, Herzlia (IL); Jonathan Heller, Nirit (IL); Ehud Waizer, Beit Yehosua (IL)

(73) Assignee: SAP AG (DE)

( * ) Notice: Subject to any disclaimer, the term of this patent is extended or adjusted under 35 U.S.C. 154(b) by 675 days.

(21) Appl. No.: 11/959,231

(22) Filed: Dec. 18, 2007

(65) Prior Publication Data

US 2009/0157812 A1    Jun. 18, 2009

(51) Int. Cl.
*G06F 17/30* (2006.01)
*G06Q 30/00* (2006.01)
(52) U.S. Cl. ...................... 707/802; 705/26.5
(58) Field of Classification Search .......... None
See application file for complete search history.

(56) References Cited

U.S. PATENT DOCUMENTS

| | | | |
|---|---|---|---|
| 7,386,535 B1 * | 6/2008 | Kalucha et al. | 1/1 |
| 7,668,849 B1 * | 2/2010 | Narancic et al. | 707/999.101 |
| 2001/0052113 A1 * | 12/2001 | Hearne et al. | 717/2 |
| 2005/0222900 A1 * | 10/2005 | Fuloria et al. | 705/14 |
| 2006/0059005 A1 | 3/2006 | Horn et al. | |
| 2007/0094414 A1 * | 4/2007 | Das | 709/248 |
| 2007/0100834 A1 * | 5/2007 | Landry et al. | 707/10 |
| 2008/0010239 A1 | 1/2008 | Nochta | |
| 2008/0168135 A1 * | 7/2008 | Redlich et al. | 709/204 |

* cited by examiner

*Primary Examiner* — Tarek Chbouki
(74) *Attorney, Agent, or Firm* — Fish & Richardson P.C.

(57) ABSTRACT

This disclosure provides various embodiments of systems, methods, and software for managing structured and unstructured data within electronic communications. In one implementation, software identifies an electronic communication associated with a user in an enterprise application; creates a link between an unstructured data element associated with the electronic communication and a structured data element associated with the enterprise application, where the link created at least partially based on one or more attributes of the electronic communication and an active process of the enterprise application; and stores the link in a link repository.

18 Claims, 4 Drawing Sheets

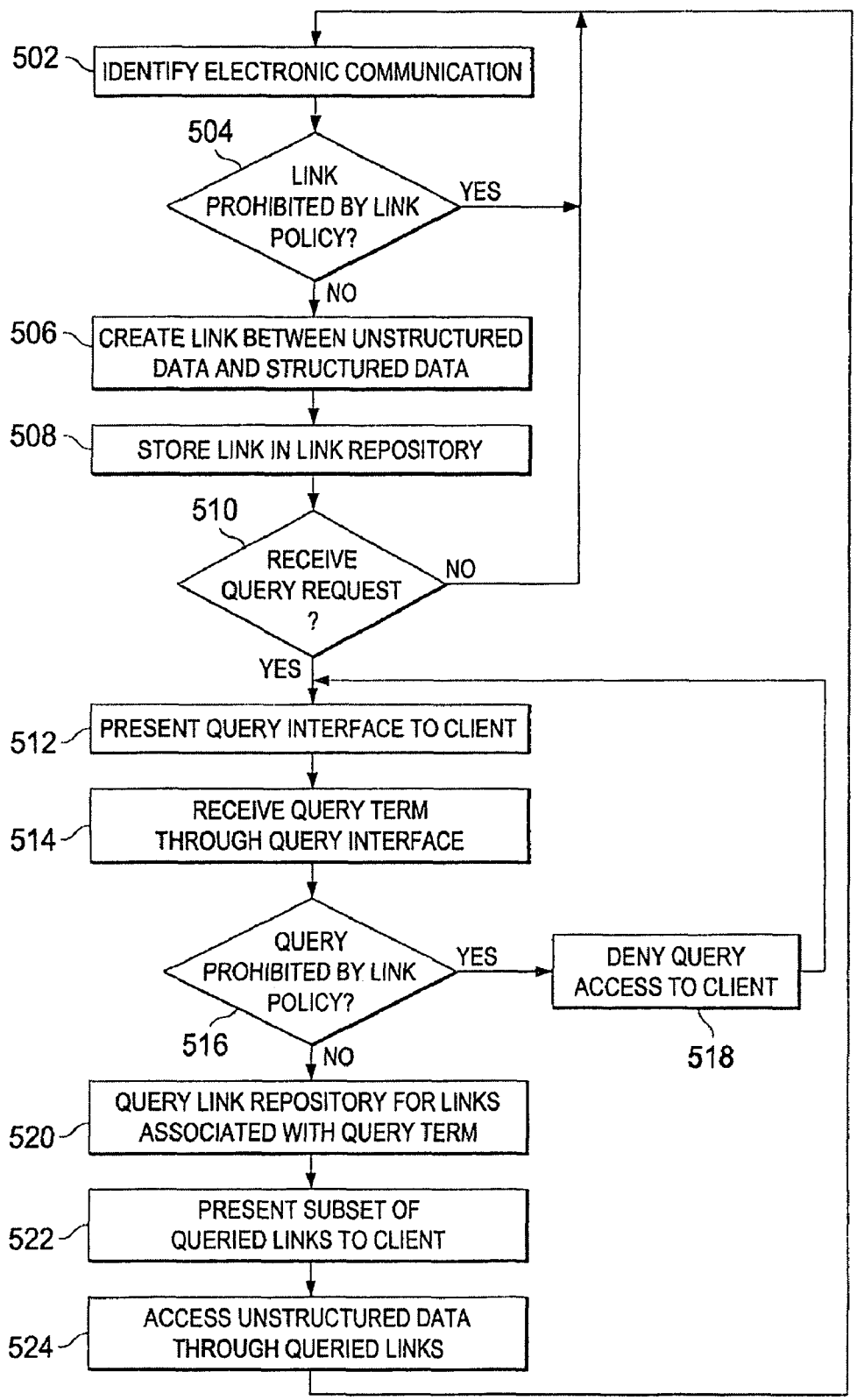

MANAGING STRUCTURED AND UNSTRUCTURED DATA WITHIN ELECTRONIC COMMUNICATIONS

TECHNICAL FIELD

This disclosure generally relates to managing structured and unstructured data within electronic communications and, more particularly, to systems, methods, and software for intelligently associating structured and unstructured data with a user's role, task, or other procedures in a business enterprise.

BACKGROUND

Information created and stored in a business environment or by a business enterprise may take many different forms and structures. In some cases, the information may be created, stored, and managed within a structured or formal business environment, such as a business application. Such information may include structured data or data objects, such as business objects or business process objects. Further, information such as structured data may be logically stored within the business application so that particular structured data may be easily associated with related data. For example, several elements of structured data related to a particular business entity may be relationally associated, thus allowing a user within the business application to more easily access and manage the data related to the business entity.

Information created and stored in the business environment or by a business enterprise may also exist in an unstructured format. Such unstructured data may be created, stored, managed, and accessed outside of the business application, yet remain pertinent to the user of the application, as well as the business enterprise as a whole. Further, this unstructured data may be logically related to the structured data managed and stored by the business application. But an association of such unstructured data with the structured data may be difficult, in part, due to the structured environment of the business application.

SUMMARY

This disclosure provides various embodiments of systems and software for managing structured and unstructured data within electronic communications. For example, in one software implementation for managing structured and unstructured data, the software identifies an electronic communication associated with a user in an enterprise application; creates a link between an unstructured data element associated with the electronic communication and a structured data element associated with the enterprise application, where the link is created at least partially based on one or more attributes of the electronic communication and an active process of the enterprise application; and stores the link in a link repository. In more specific aspects, the link repository may include at least one link index, including a plurality of links. Further, the software may query the link repository to identify a subset of links associated with a query term and present the subset of queried links to the user. The query term may include a business entity; a supplier; a customer; a product; and a product component. In particular aspects, the software may present the subset of queried links to the user via the enterprise application.

In some, more specific, aspects, the structured data element may include a business object related to a business entity and the unstructured data element may include at least one of the electronic communications and an electronic document associated with the electronic communication. The software may be a client agent that identifies the electronic communication by monitoring the active process, where the active process includes one or more client-side processes. The electronic communication may be, in some aspects, at least one of an electronic mail communication; an electronically logged physical communication; a text message communication; and an instant message communication. The electronic communication attributes may include a date of the electronic communication; a subject of the electronic communication; a content of the electronic communication; and a recipient of the electronic communication. The active process of the enterprise application may be a procurement process; a complaint process; a scheduling process; a database module; and a sales process.

In certain specific aspects of the software, the software may create the link between the unstructured data element and the structured data element upon instigation of the electronic communication by the user, the link creation based on a recipient of the electronic communication and a role of the user in the active process.

In another general software implementation for managing structured and unstructured data, the software queries one or more links stored in a link repository; presents at least a subset of the queried links to the user; and accesses the one or more unstructured data elements of the electronic communication through the queried links. Each link associates one or more unstructured data elements of an electronic communication with a structured data element of an enterprise application, where the association is at least partially based on one or more attributes of the electronic communication and an active process of the enterprise application. The query may, in particular aspects, include one or more terms, where at least one query term is a business entity; a supplier; a customer; a product; a service; and a product component.

In more specific aspects, the software may present the subset of the queried links to the user via the enterprise application. Further, the software may prohibit the query based on a link policy; identify a second electronic communication from the user in the enterprise application; and prohibit creation of a link between a second unstructured data element associated with the second electronic communication and a second structured data element associated with the enterprise application based on the link policy. The link policy may include a sensitivity of at least one of the second structured data element or the second unstructured data element; a relevance of at least one of the second structured data element or the second unstructured data element; a user role; and the active process of the enterprise application.

In some aspects, the software may present the one or more queried links to the user in a hierarehal order based on at least one of the active process of the enterprise application; at least one attribute of the electronic communication; the unstructured data element; and the structured data element. The attribute of the electronic communication may include a date of the electronic communication; a subject of the electronic communication; a content of the electronic communication; and a recipient of the electronic communication.

Each of the foregoing, as well as other disclosed example software are computer implementable. Moreover, some or all of these aspects may be further included in respective systems and methods for managing structured and unstructured data within electronic communications. The details of these and other aspects and embodiments of the disclosure are set forth in the accompanying drawings and the description below.

Features, objects, and advantages of the various embodiments will be apparent from the description and drawings, and from the claims.

DESCRIPTION OF DRAWINGS

FIG. 3 is an example flowchart illustrating the management of structured and unstructured data within electronic communications by a data link module, in accordance with certain embodiments included in the present disclosure.

DETAILED DESCRIPTION

Figure 1:
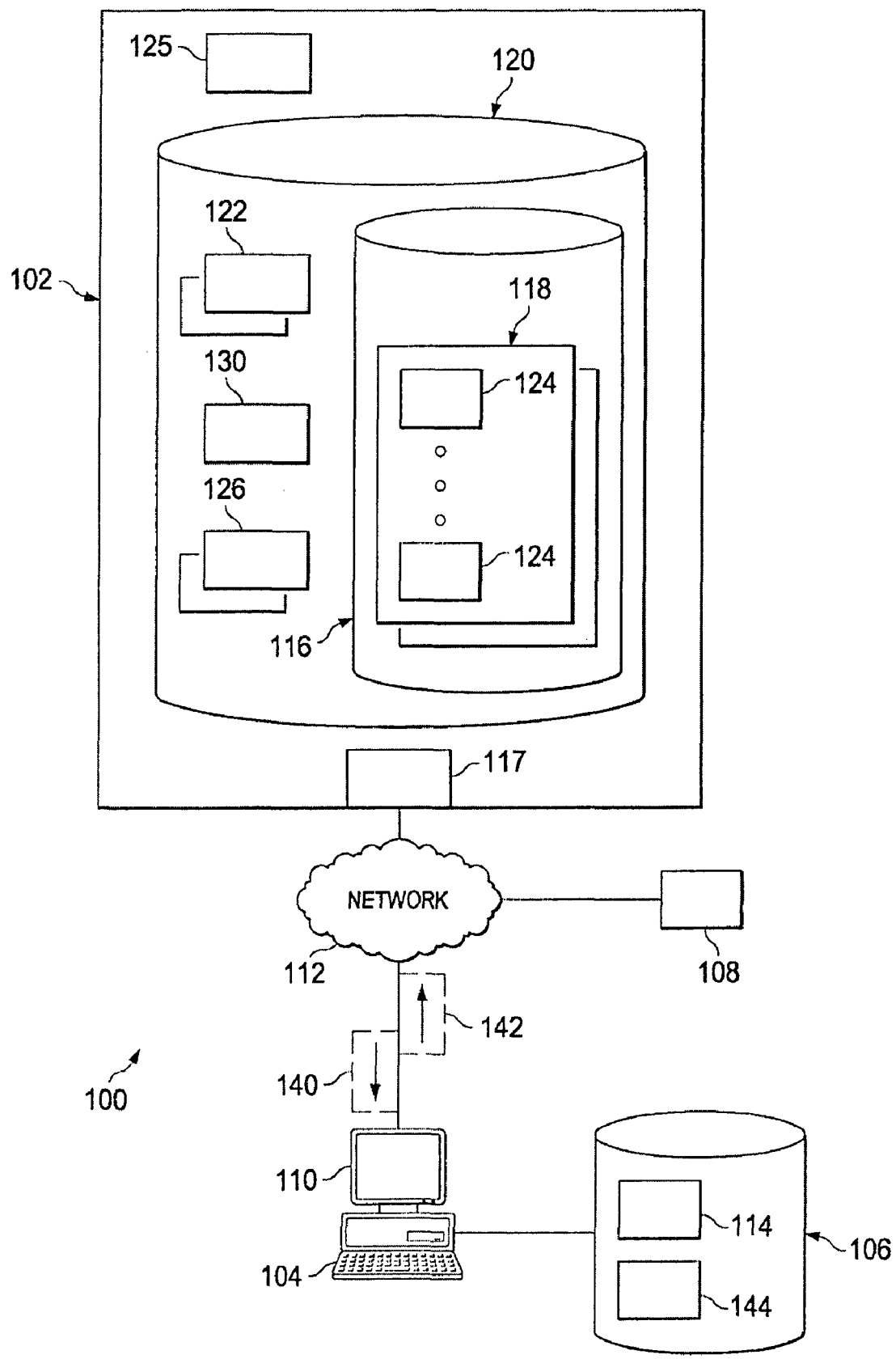
FIG. 1 illustrates an example system for the management of structured and unstructured data within electronic communications by a data link module in accordance with certain embodiments included in the present disclosure.

The present disclosure involves systems, methods, and software for intelligently associating structured and unstructured data with a user's role, task, or other procedures in a business enterprise. For example, FIG. 1 illustrates one system 100 that captures, sends, receives, monitors, or otherwise identifies communications between various individuals, computers, departments, businesses, or other contacts by a data link module. At a high level, these communications include any suitable electronic communication (which can include communications at least partially across electronic channels and communication that can be electronically monitored) including emails, text messages, logged phone calls, or physical mail, electronic or physical payments, meetings, and so forth. The system 100 can then generate, for example, one or more links between unstructured data and structured data residing within an enterprise application (i.e., a business application) using some of these communications as appropriate. These particular communications are identified in order to, for example, associate unstructured data utilized by the user outside of the enterprise application with structured data utilized within the enterprise application. In certain embodiments, one or more links between the constructured data and structured data may be created and stored upon an instance of the electronic communication by the user within an unstructured data environment (e.g., an electronic mail client). The link is created based on one or more attributes of the communication such as, for example, the recipient of the communication, a subject of the communication, or other appropriate attribute, and a current role of the user within the enterprise application. For instance, the current role of the user may be identified through an active process of the business application (e.g., an active window, a background process running in the business application, or a process loaded into the business application), or other user activity, concurrent (or associated) with the electronic communication. Further, the data link module may query stored links to identify unstructured data associated with particularly relevant structured data within the business application. In certain embodiments, the creation and querying of links may be subject to a link policy, which manages or controls access to or the creation of the links.

Generally, system 100 uses data link module 114 to identify communications from a client or user, such as client 104, in order to develop one or more of these links 124 associating unstructured data (e.g., e-mails, e-mail attachments, and electronic documents associated with the electronic communication) in a working environment with structured data 122 within a business application 130. In some aspects, the data link module 114 may more easily capture the associations that exist within the working environment between unstructured data and structured data 122 in a streamlined fashion. The data link module 114 may also provide context to the link 124 between the unstructured data and structured data 122 based on the role of the client 104 within the business application 130. In other words, the link 124 may encapsulate data (or metadata) from an active process of the business application 130 concurrent with the electronic communication. Further, various aspects of the system 100 may allow for the identification of particular business processes (e.g., procurement processes, customer service processes, and sales processes) implemented outside of the current module of business application 130 but within the working environment of the client 104. For example, client 104 may be executing a particular module of business application 130, while presenting a front-end to a distributed third party procurement or financial system. Thus, the identification of the particular business process may allow for better support for such process within the business application 130. System 100 can allow a user of the business application 130 to search for and view unstructured data related to a particular business entity (e.g., a supplier, commercial partner, or customer) in order to develop a more complete context of the business entity with data found outside of the business application 130. Further, in some aspects, the system 100 may allow the user to concurrently and seamlessly work in an online office environment (e.g., an electronic mail environment) and business application 130 to create associations between the unstructured data and structured data dements 122 without interruption of a mail exchange server or system.

System 100 may also monitor a client 104 or other employee of the business enterprise to identify particular business processes existing entirely or substantially outside of the structured business application. For example, a customer complaint may trigger an audit workflow process existing entirely through electronic communications between the enterprise, customer, and, for instance, a supplier. In other words, the processing and handling of the complaint and its resolution may exist entirely within the electronic mail system of the enterprise. By recognizing that tins process exists outside of the business application, by, for example, querying stored links 124, which associate unstructured data (e.g., the electronic communications) and structured data elements 122, the process may be brought into the structured business environment and improved.

Turning to the illustrated embodiment, system 100 includes or is communicably coupled with server 102, one or more clients 104, and one or more contacts 108, at least some of which communicate across network 112. Server 102 comprises an electronic computing device operable to receive, transmit, process, and store data associated with system 100. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute an operating system including Linux, UNIX, Windows Server, or any other suitable operating system. According to one embodiment, server 102 may also include or be communicably coupled with a web server and/or a mail server. In particular embodiments, server 102 may be communicably coupled to an instant message (IM) server, as well as, a server or servlet for storing, transmitting, or otherwise managing voicemail messages. Further, in certain embodiments, server 102 may be communicably coupled to a server that stores, transmits, or otherwise manages communications from a cellular phone, a personal digital assistant (PDA), a pager, or any other electronic device capable of sending, receiving, or otherwise transmitting electronic communications.

Illustrated server 102 includes memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes or points to one or more structured data elements 122, one or more unstructured data elements 126, a business application 130, and a link repository 116. But memory 120 may also include any other appropriate data such as an organization's structure, contacts, or other human resources data, VPN applications or services, firewall policies, a security or access log, print or other reporting files, HTML or XML files or templates, data classes or object interfaces, child software applications or sub-systems, and others.

Structured data elements 322 stored in memory 120, generally, contain data describing, referring to, or relating to a business entity or business process within business application 130. For example, a structured data element 122 may include contact information and business information related to a customer, supplier, product, service, or product component supported by or managed by business application 130. In certain embodiments, each structured data element 122 may be one or more business objects or business process objects.

At a high level, a business object is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with customer relationship management (CRM) below finance and supplier relationship management (SRM) below CRM.

More specifically, the business object 122 may encompass both functions, generally in the form of methods, and data, such as attributes of the business entity. A dependent object (DO) is a business object that is used in or by another business object, such as an order item in a purchase order. A hosting object (HO), such as the purchase order, is the object which references a dependent object, such as the order item. The hosting object has to implement the association between the two objects. Associations between a hosting object and its dependent objects may be determined by executing a retrieve-by-association method call on the hosting object. The attributes for an object may be obtained by executing a retrieve method call on the business object node.

The implementation details of a business object 122 are typically hidden from a non-development user, such as an end user, and the business object may be accessed through defined functions. Accordingly, the business object 122 may be considered encapsulated. Business object 122 may be used to reduce a system into smaller, disjunctive units. As a result, business objects 122 improve a system's structure while reducing system complexity. Business objects 122 also form a point of entry of the data and functions of a system and enable the system to easily share data, communicate, or otherwise operate with other systems. According to one implementation, business object 122 may include multiple layers.

The innermost layer of the example business object 122 is the kernel layer. The kernel layer represents the business object's inherent data, containing various attributes of the defined business object. Inherent data may include, for example, an employee's name, age, status, position, address, etc. The second layer represents the integrity layer. In the example business object 122, the integrity layer contains the business logic of the object. Such logic may include business rules for consistent embedding in the environment 100 and the constraints regarding the values and domains that apply to the business object 122. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object 122. The third layer, the interface layer, may supply the valid options for accessing the business object 122 and describe the implementation, structure, and interface of the business object to the outside world. To do so, the interface layer may contain methods, input event controls, and output events. The fourth and outermost layer of the business object 122 is the access layer. The access layer defines the technologies that may be used for external access to the business object's 122 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 122 of this embodiment may implement standard object-oriented technologies such as encapsulation, inheritance, and/or polymorphism.

Accordingly, the third layer separates the inherent data of the first layer and the technologies used to access the inherent data. As a result of the described structure, the business object 122 reveals only an interface that includes a set of clearly defined methods. Thus, applications typically access the business object 122 via those defined methods. An application wanting access to the business object 122 and the data associated therewith must include the information or data required to execute the clearly defined methods of the business object's interface. The clearly defined methods of the business object's interface represent the business object's behavior. That is, when the methods are executed, the methods may change the business object's data. Therefore, an application may utilize any business object 122 by providing the required information or data without having any concern for the details related to the internal operation of the business object 122.

To ensure the consistency of interfaces, the business object model may be built using standardized data types as well as packages to group related elements together, and package templates and entity templates to specify the arrangement of packages and entities within the structure.

Data types are used to type object entities and interfaces with a structure. This typing can include business semantic. For example, the data type "BusinessTransactionDocumentID" is a unique identifier for a document in a business transaction. Also, as an example, Data type "BusinessTransactionDocumentParty" contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDT's, or a context-specific assembly of GDT's or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities. Packages group the entities in the business object model and the resulting interfaces into groups of semantically associated information. Packages also may include "sub"-packages, i.e., the packages may be nested.

The foregoing business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

It will be understood that such various business object data may be stored or processed using at least one data structure, object, record or file. In a more specific example, a business object may include the user's personal contact information, weather information, a profit and loss report of a company, an OLAP (on-line analytical processing) report, portion of a sales order, an online quotation, as well as many others. In some embodiments, the business object (or pointers thereto) may be stored in an enterprise-wide repository as one or more tables in a relational database described in terms of SQL statements or scripts. In another embodiment, a business object may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. In short, a business object may comprise one table or file or a plurality of tables or files stored on one computer or across a plurality of computers in any appropriate format.

Conversely, unstructured data 126 can be considered information that is not currently associated with a specific structure within the active portion of business application 130. More specifically, system 100 also includes (or otherwise references) unstructured data 126 that can include flat files, attachments, faxes, spreadsheets, graphical elements, design drawings, slide presentations, text documents, mail messages, webpage, source code, or other files. In particular, structured data can be considered unstructured data 126 if it is analyzed without its metadata or outside the context of the particular application, database, or process. For example, an application can generate an unstructured element based on structured data. In another example, a database can export more structured database records into unstructured data elements 126. Moreover, an active process may not recognize the structure of an unrelated (or unknown) structured element 122 and process it as an unstructured element 126.

Business application 130, at a high level, provides a structured environment (e.g., a software application) from which one or more enterprise processes, modules, or applications may be operated by, for instance, client 104. In other words, business application 130 provides an environment in which client 104 may manipulate, manage, or view business information, such as the structured data elements 122. Regardless of the particular implementation, "software" may include software, firmware, wired or programmed hardware, or any combination thereof as appropriate. Indeed, business application 130 may be written or described in any appropriate computer language including C, C++, Java, Visual Basic, assembler, Perl, any suitable version of 4GL, as well as others. For example, business application 130 may be a composite application, portions of which may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that business application 130 may include numerous other sub-modules or may instead be a single multi-tasked module that implements the various features and functionality through various objects, methods, or other processes. Further, while illustrated as internal to server 102, one or more processes associated with business application 130 may be stored, referenced, or executed remotely. For example, a portion of business application 130 may be a web service that is remotely called, while another portion of business application 130 may be an interface object bundled for processing at client 104. Moreover, business application 130 may be a child or sub-module of another software module or enterprise application (not illustrated) without departing from the scope of this disclosure.

Memory 120 also includes at least a portion of a link repository 116. Link repository 116, in more detail, may store data in a relational format, thus allowing the memory 120 to provide access to such data in the repository 116 using a structured query language (SQL), which may include any of the plurality of versions of the SQL relational database query and manipulation language such as, for example, SEQUEL, ANSI SQL, any other proprietary or public variant of SQL, or other suitable or generic query language (such as eXtensible Markup Language (XML)). As illustrated in FIG. 1, memory 120 may include all of link repository 116, but link repository 116 may be stored on one or more remote servers, memories, or data repositories, including, for example, client 104 and distributed storage 106.

Link repository 116 includes one or more link indices 118, which may contain multiple stored links 124. Generally, each link index 118 includes stored links 124 in a structural format. In some embodiments, each link index 118 may be separated based on particular attributes of the stored links 124 contained therein. For example, a particular link index 118 may contain links 124 generated while the client 104 is involved in a particular active process of the business application 130. As just one specific example, particular stored links 124 may be generated while a procurement process is active within the business application 130. In other words, the stored links 124 may be generated in the context of a role of the client 104 within the procurement process, and stored links 124 created while the procurement process is active may be stored in a single link index 118. By storing related links 124 in particular link indices 118, stored links 124 may, typically, be more easily sorted or queried based on their creation context (e.g., the active process of the business application 130).

Illustrated server 102 also includes processor 125. Processor 125 executes instructions and manipulates data to perform the operations of server 102. Processor 125 is, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes the business application 130, as well as any other modules, sub-modules, or applications stored on server 102 or accessed by server 102.

Server 102 may also include interface 117 for communicating with other computer systems, such as clients 104, over network 112 in a client-server or other distributed environment. In certain embodiments, server 102 sends and receives data between internal or external senders through interface 117 for storage in memory 120 and/or processing by processor 125. This data may include electronic communications, one or more created links 124, one or more queries 142 of stored links 124 in the link repository 116 from client 104, and one or more query responses 140 (perhaps including a link 124). Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104 and contacts 108. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.11n, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. In other words, network 112 encompasses any internal or external network, networks, sub-network, or combination thereof operable to facilitate communications between various computing components in system 100. Network 112 may communicate, for example, Internet Protocol (IP) packets, Frame Relay frames. Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain remote clients 104.

Continuing with FIG. 1, client 104 is any computing device operable to connect or communicate with server 102 or network 112 using any communication link. At a high level, each client 104 includes or executes at least GUI 110 and comprises an electronic computing device operable to receive, transmit, process, and store any appropriate data associated with system 100. While illustrated separately, client 104 typically includes distributed storage 106 (shown with, data link module 114 and a link policy 144) or is coupled with some relatively remote or distributed memory that may be quickly accessed. It will be understood that there may be any number of clients 104 communicably coupled to server 102. Further, "client," "contact," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers.

As used in this disclosure, client 104 is any computer used by a person, department, organization, small business, enterprise, or any other entity that may use or communicate with system 100, namely business application 130. For simplicity, client 104 may encompass a personal computer, touch screen terminal, workstation, network computer, kiosk, wireless data port, smart phone, personal data assistant (PDA), one or more processors within these or other devices, or any other suitable processing device used by or for the benefit of client 104. For example, client 104 may be a PDA operable to wirelessly connect with an external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 110. Both the input device and output device may include fixed or removable storage media such as a magnetic computer disk, CD-ROM, or other suitable media to both receive input from and provide output to users of clients 104 through the display, namely, the client portion of GUI or application interface 110.

Continuing with client 104, in particular embodiments, client 104 includes data link module 114 or an agent associated therewith. Data link module 114, generally, identifies an electronic communication from the client 104 to, for example, one or more contacts (or groups) 108 and creates a link 124 based on the electronic communication and an active process of the business application 130. The data link module 114 also persists the link 124 in link repository 116. Further, data link module 114 provides the client 104 a query interface (shown in more detail in FIG. 4). In certain implementations, data link module 114 may be an electronic mail client plug-in or a browser plug-in. As the plug-in, data link module 114 may identify many or all communications from client 104 and transmit these client communications to server 102 over network 112.

In some embodiments, data link module 114 may reside on server 102 and be accessible by client 104 or a client agent through network 112. In such embodiments, the data link module 114 may be unable to capture one or more attributes of the electronic communication (e.g., the recipient of the communication, the subject of the communication, a date of the communication, or content of the communication) when the client 104 sends the communication. But the communication attribute maybe captured by an electronic communication agent of the data link module 114 on the server 102, such as an e-mail agent. In such instances, creation of the link 124 may be asynchronous to the electronic communication, or, in other words, created subsequent to the client 104 sending the electronic communication to, for example, one or more contacts 108. In some aspects which include a communication server, such as a mail server, the mail server operation may be interrupted by a use of such electronic communication agent on the mail server.

Link policy 144, generally, resides on the distributed storage 106 communicably coupled to client 104. In some aspects, however, link policy 144 may be stored on server 102 or other memory location remote from client 104. The link policy 144, typically, guides, manages, or otherwise governs the creation of links 124 and queries 142 by the data link module 114. At a high level, the link policy 144 includes one or more rules, which ensure that the created links 124 associate, for example, only relevant unstructured data elements and structured data elements 122. Further, the link policy 144 may ensure that associations of sensitive unstructured data elements or structured data elements 122 (e.g., confidential information, or information restricted to particular clients or users) may be prohibited based, for example, on a hierarchal status of the client 104. For example, unstructured data elements (e.g., e-mails, e-mail attachments, or electronic documents associated with the electronic communications) containing financial data of an enterprise may be exclusively restricted to management personnel of the enterprise. Thus, if client 104 is an IT employee of the enterprise, the data link module 114, relying on the link policy 144, may prohibit a link creation of such unstructured data elements with structured data elements 122.

GUI 110 comprises a graphical user interface operable to allow the user of client 104 to interface with at least a portion of system 100 for any suitable purpose, such as viewing or managing one or more processes of the business application 130, one or more links 124 returned via 140, unstructured data accessible through the queried links 124, or customizing or otherwise managing other applications, or other data. Generally, GUI 110 provides the particular user with an efficient and user-friendly presentation of data provided by or communicated within system 100. GUI 110 may also comprise a plurality of customizable frames or views having interactive fields, pull-down lists, and buttons operated by the user, as well as queried links 124 and unstructured data and structured data elements 122 in a variety of formats. GUI 110 may offer the client 104 various filters that allow review of only certain contacts, communications, and types of each. For example, GUI 110 may be operable to allow client 104 to view a query interface, such as the query interface illustrated in FIG. 4.

It should be understood that the term graphical user interface may be used in the singular or in the plural to describe one or more graphical user interfaces and each of the displays of a particular graphical user interface. Indeed, reference to GUI 110 may indicate a reference to the front-end or a component of business application 130, as well as the data link module 114 via client 104, as appropriate, without departing from the scope of this disclosure. Therefore, GUI 110 contemplates any graphical user interface, such as a generic web browser or touch screen that processes information in system 100 and efficiently presents the results to the user. Server 102 can accept data from client 104 via the web browser (e.g., Microsoft Internet Explorer or Mozilla Firefox) and return the appropriate HTML or XML responses to the browser using network 112.

Figure 2A:
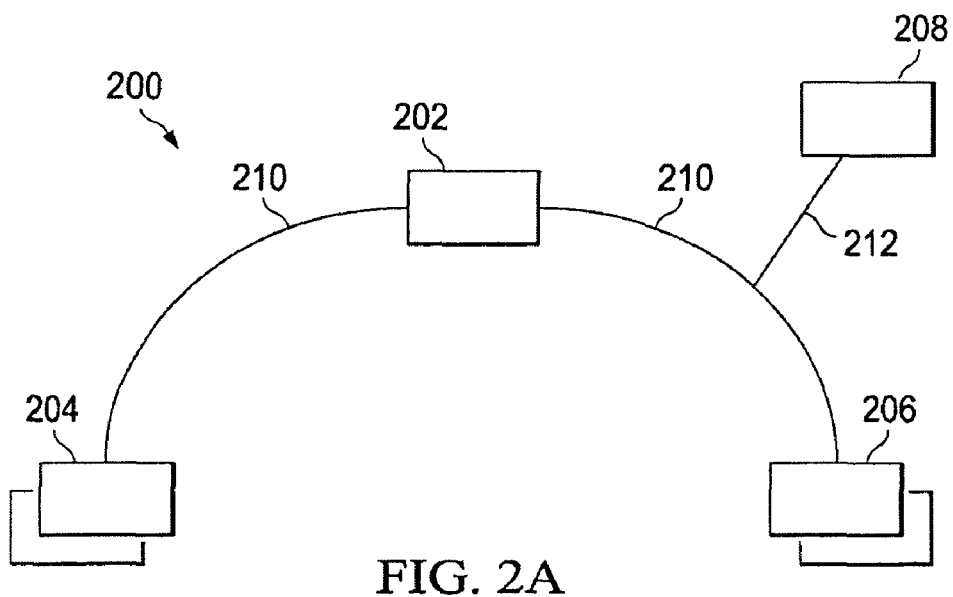
FIGS. 2A-C are graphical illustrations of associations created by a data link module between unstructured data and structured data, in accordance with certain embodiments of the system of FIG. 1.

FIG. 2A provides a graphical model 200 of a relationship between a user 202, one or more unstructured data elements 204, one or more structured data elements 206, and an active process 208 of a business application. In some aspects, graphical model 200 represents the relationship of such elements as these elements are described in system 100. More specifically, model 200 illustrates the relationship of the user 202, unstructured data elements 204, structured data elements 206 (e.g., business objects) within an enterprise environment before a data link module, such as data link module 114, is operable within such environment. As shown in FIG. 2A, the user 202 maintains an interaction 210 with both the unstructured data elements 204 and the structured data elements 206. In some aspects, however, the interactions 210 may be distinct. For example, the user 202 may have an interaction 210 with structured data elements 206 within the processes of the business application. Such processes may include, for instance, a procurement process, a customer service process, an inventory management process, as well as any appropriate process within the enterprise environment. At any point, the user 202 may be involved in one or more active processes 208. In such active processes 208, the user 202 may have one or more specific roles, such as, for example, a buyer, a manager, a technical expert, or a customer service representative. Moreover, the role of the user 202 may be dependent on the active process 208 concurrent with the interaction 210 between the user 202 and the structured data elements 206. Thus, the active process 208 of the business application may provide a context 212 within the business application for the interaction 210.

Continuing with FIG. 2A, the interaction 210 between the user 202 and the unstructured data elements 204 may, typically, occur outside of the framework or processes of the business application. For example, in some instances, the interaction 210 between the user 202 and unstructured data elements 204 may occur in a working environment of the user 202, such as an electronic mail environment. In such cases, the unstructured data elements 204 may include, for example, e-mails, attachments to e-mails, or other electronic documents associated with the electronic communication. Because the interaction 210 between the user 202 and unstructured data elements 204 occurs outside of the business application, one or more active processes 208 of the application may not provide any context to such interaction 210. While there may be (and often are) logical associations between the unstructured data elements 204 and structured data elements 206, such associations may not be based on the active processes 208 of the business application and, typically, exist outside of both the business application and working environment of the user 202. These associations, therefore, may be inaccessible to multiple users 202 within the enterprise environment, thereby decreasing their usefulness.

Figure 2B:
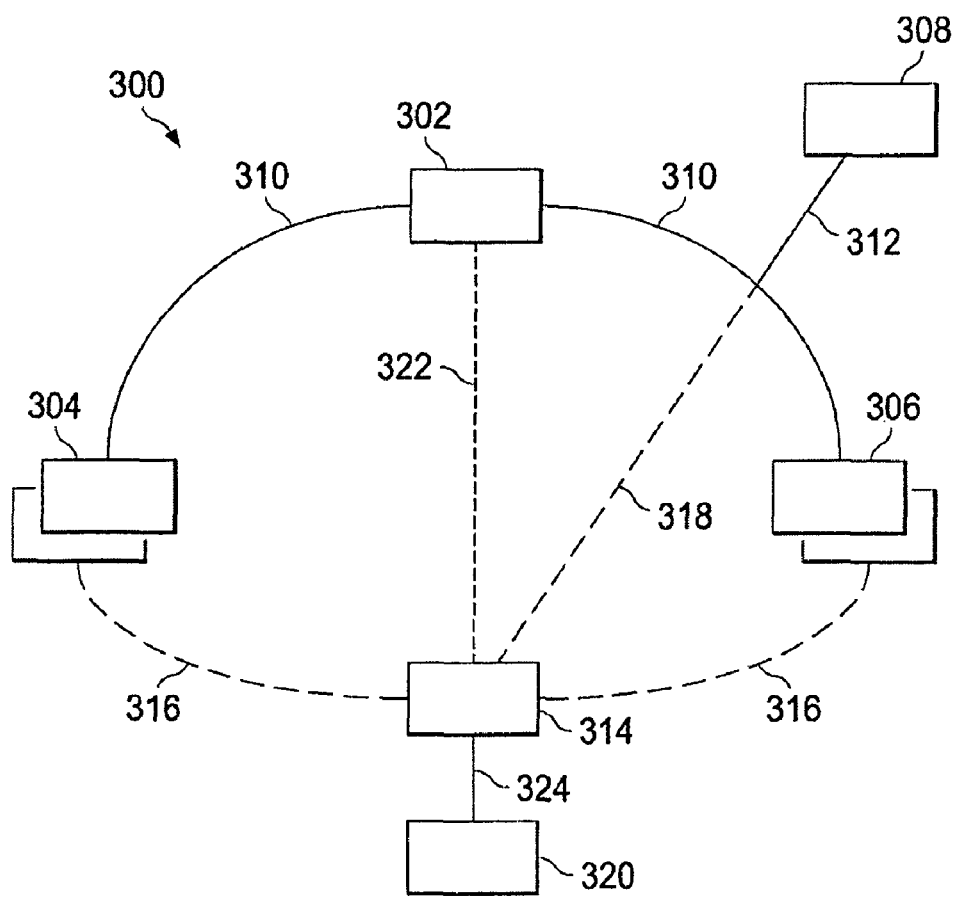

FIG. 2B provides a graphical model 300 of a relationship between a user 302, one or more unstructured data elements 304, one or more structured data elements 306, an active process 308 of a business application, a link 314, a link policy 320, and a data link module 322. In some aspects, graphical model 300 represents the relationship of such elements as these elements are described in system 100, including the data link module 114 in system 100. More specifically, the model 300 illustrates a creation of the link 314 by a data link module 322, which may associate logically related unstructured data elements 304 existing in a working environment (e.g., electronic mail environment) and structured data elements 306, such as business objects, existing in a business application. For instance, when the user 202 instigates an electronic communication within the working environment, the link 314 is created by the data link module 322, which captures particular attributes of the electronic communication (e.g., a recipient, a date, or a subject of the communication) that may be related to the structured data element 306. Thus, the link 314 associates the unstructured data elements 304 (e.g., the electronic communication or file associated with the electronic communication) with the structured data elements 306 through link connections 316.

The link 314 may also encapsulate one or more active processes 308 of the business application, graphically represented by a process application 318. For example, it may be helpful when viewing the link 314 to understand the context in which the link 314 was created. In other words, the active processes 308 of the business application concurrent to creation of the link 314 may provide context to the association of the unstructured data elements 304 and structured data elements 306 beyond that available otherwise. As one example, the user 302 may be a customer service representative within an enterprise environment. The representative may receive a customer complaint pertaining to a particular product component, where such component is procured from a supplier. In order to resolve the complaint, the representative activates a procurement module within the business application to determine the supplier contact information, component details, or a host of additional information. The representative may send an electronic communication, such as an e-mail, to the supplier, attaching the customer complaint. A data link module creates a link at the moment of the communication, associating the representative's e-mail and attached complaint with the supplier record within the business application. In addition, the link created by the representative through the data link module encapsulates the active procurement module of the business application, or, in other words, the link maintains the context of the active processes within the business application. The link is thus stored for later users of the enterprise environment, such as other customer service representatives or procurement officers, to access the unstructured data elements to gain additional insight into the particular supplier.

As shown in FIG. 2B, the link 314 may also be subject to the link policy 320 through one or more policy rules 324. Generally, the link policy 320 provides one or more rules 324, which ensure that the link 314 associates relevant unstructured data elements 304 with structured data elements 306. Continuing the previous example, the representative may have a social relationship with the supplier, and sends the supplier a social communication. Such personal communication may be irrelevant within the enterprise environment. The applicable link policy may thus prohibit a creation of a link based on the personal communication as irrelevant. Moreover, the link policy 320 may prohibit the creation of the link 314 based on the sensitivity of the unstructured data elements 304 or structured data elements 306. For example, the customer complaint sent to the representative may contain sensitive financial information or, for instance, be marked confidential as sent to the representative. As another example, the supplier record within the business application may be restricted to only particular employees within the enterprise. The link policy may prohibit creation of the link due to the sensitive nature of the communication or the restricted nature of the supplier record.

Figure 2C:
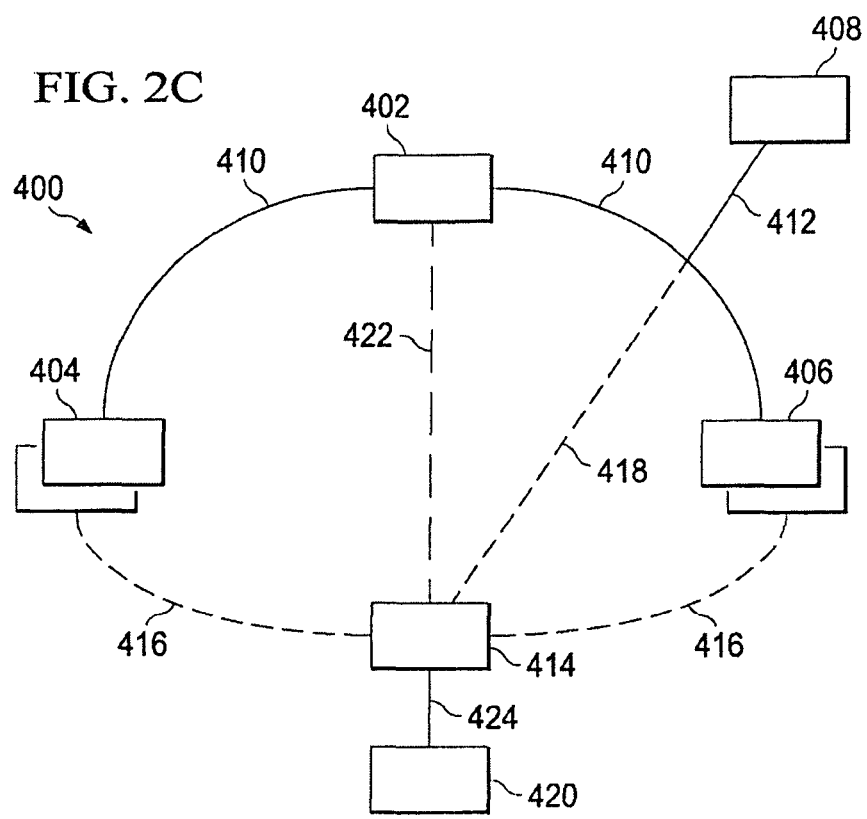

FIG. 2C provides a graphical model 400 of the relationship between a user 402, one or more unstructured data elements 404, one or more structured data elements 406, an active process 408 of a business application, one or more stored links 414, a link policy 420, and a data link module 422. In some aspects, graphical model 400 represents the relationship of such elements as these elements are described in system 100, including the data link module 114 in system 100. More specifically, model 400 illustrates a query by the data link module 422 of the stored links 414, subject to the link policy 420 through one or more policy rules 424. Continuing the above example, the customer service representative may receive multiple complaints from customers regarding the particular component procured from the supplier. As described above, the representative may send multiple electronic communications (e.g., e-mails) to the supplier disclosing such complaints, thus creating multiple links between the communications (and attached complaints) and the supplier record in the business application. Subsequent to such links being created, a new procurement officer joining the enterprise may wish to view all the data (unstructured and structured) related to the supplier. The procurement officer may utilize the data link module to query the links based on the supplier. Thus, the procurement officer may access the unstructured data elements (e.g., the e-mails from the representative and the attached complaints) associated with the supplier record (e.g., the structured data elements of the supplier). The unstructured data elements may then be viewed within the officer's working environment (e.g., e-mail environment) or business application.

The query by the data link module 422 may also be subject to the link policy 420 and policy rules 424, the active process 408 of the business application concurrent with the query, as well as, in some aspects, the active process 408 of the business application when the stored link 414 was created. For example, the link policy may require that the procurement officer act within the role of "procurement officer," i.e., work within an active procurement process of the business application, in order to query the stored links. Moreover, the link policy may prohibit the procurement officer from querying particular stored links due to a sensitivity of the unstructured or structured data elements associated by the links. In other words, each user may be assigned a particular sensitivity level, which may limit access to particular data elements containing sensitive or confidential information.

FIG. 3 is an example flowchart illustrating a method 500 for the management of structured and unstructured data within electronic communications by an appropriate data link module, in accordance with certain embodiments included in the present disclosure. In some embodiments, method 500 may be implemented by a system in an enterprise environment for managing structured and unstructured data within electronic communications, such as, for example, system 100. Method 500 may begin at step 502, as a data link module identifies an electronic communication sent from a client, or user, to one or more contacts or groups. In some aspects, the communication may be an electronic mail communication, however, the communication may also be an electronically logged physical communication, a text message communication, or an instant message (IM) communication. In identifying the electronic communication, the data link module may capture one or more attributes of the communication, such as a recipient (e.g., the "to," "cc," or "bcc"), a date, or a subject of the communication. In step 504, a link policy may apply one or more policy rules to determine if creation of a link between unstructured data and structured data is prohibited. For instance, the data link module 114, through the link, policy and policy rules, may prohibit the creation of a link between unstructured data (e.g., e-mails, e-mail attachments, electronic documents, electronic meeting invitations, or files associated with the electronic documents) and structured data (e.g., business objects) based on, for example, the role of a user of method 500 within the enterprise environment, one or more active processes within a business application of the enterprise environment, a relevancy of the unstructured data, and a sensitivity of the unstructured or structured data.

If, at step 504, the link policy prohibits the creation of a link between the unstructured data and structured data, the data link module continues to identify electronic communications in step 502. But if the link creation is not prohibited, then the data link module 114 creates the link 124 between unstructured data and structured data in step 506. When appropriate, the data link module 114 then store the link 124 in a link repository in step 508. Some or all of the link repository 116 may reside on a server in the enterprise environment, one or more clients of the enterprise environment, or spread across multiple computing devices within and outside of the enterprise environment, such as in a hosted environment. Further, the link 124 may be stored in one or more link indices within the link repository, which may be organized according to one or more attributes of the electronic communication.

Figure 4:
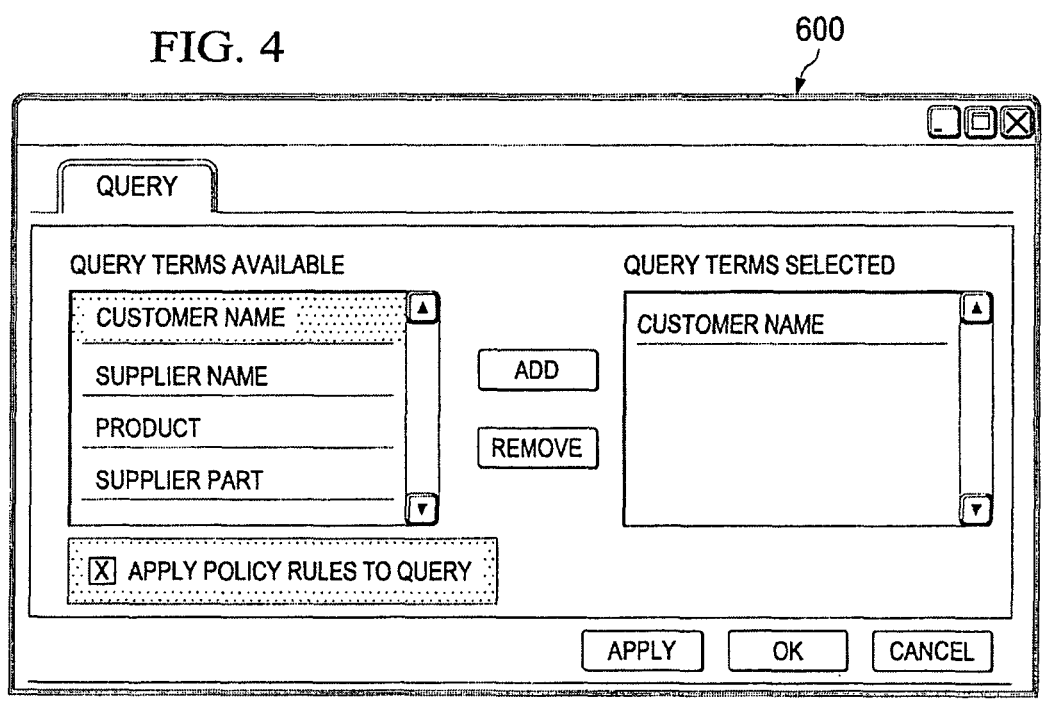
FIG. 4 depicts an example Graphical User Interface (GUI) utilized to present one or more query terms to a data link module, in accordance with certain embodiments included in the present disclosure.

Continuing with method 500, the data link module 114 may receive a query request in step 510. Turning briefly to FIG. 4, an example query interface 600 utilized to present query terms to a data link module is illustrated. Query interface 600, generally, allows a client or user to customize a query of stored links in the link repository. For example, the client may select one or more available query terms to govern the query, such as, for example, a customer name, a supplier name, a product, or a product component. Such queries may be manual or automatic as appropriate. For example, the user may (relatively manually) select the link 122 via the GUI 110. In another example, the client (via some process executing thereon) can automatically select the link to enhance the interface with the appropriate data, perhaps according to pre-defined rules, profiles, and so on. In some aspects of the interface 600, the query terms may be keyed to records within the business application (e.g., business objects). The interface 600 may also include a selectable "box" allowing the client to choose whether to apply the policy rules in the link policy to the query. In some cases, only particular clients of the enterprise application, such as officers or system administrators may be allowed to select or deselect this box. For example, as illustrated in FIG. 4, the selectable box is "grayed out" (i.e., unavailable for selection).

Turning back to FIG. 3, if the data link module 114 receives the query request, the query interface is presented to the client in step 512. The data link module 114 then receives one or more query terms through the query interface in step 514. In step 516, the data link module determines if the query is prohibited by the link policy. For example, the link policy and the policy rules within the policy may prohibit the query based, at least in part, on the active process of the business application concurrent with the query, the active processes of the business application when one or more links were created, as well as the relevancy or sensitivity of the unstructured or structured data. In some aspects, the link policy may prohibit querying a stored link if the link has already been queried once before. If the query is prohibited by the link policy, the data link module may deny query access to the client in step 518.

If, however, the query 142 is allowed by the link policy, then the data link module 114 queries the link repository 116 for stored links 124 associated with the query term provided by the client in step 520. Next, the data link module 114 presents one or more queried links associated with the query term to the client in step 522. The data link module 114 may then access the unstructured data through the queried links in step 524 through, for example, a working environment of the client (e.g., an electronic mail environment) or the business application. In some aspects, the queried links may be presented in a hierarchal order based on, for example, a relevance of the unstructured data or an attribute of the electronic communication (e.g., a recipient, a date, a subject, or a content of the communication).

The preceding flowcharts and accompanying description illustrate example methods. Data link module 114 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the data link module 114 may implement techniques with additional steps, fewer steps, and/or different steps, so long as the methods remain appropriate, for example, in certain cases, unstructured data may include an electronic document associated with an electronic communication, such as a document or file accessible through the electronic communication by a hyperlink (i.e., an embedded hypertext link). In short, although this disclosure has been described in terms of certain embodiments and generally associated methods and processes, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A Non-transitory computer readable storage medium storing executable software which when executed by processor performs the following steps:
   identify an electronic communication associated with a user in an enterprise application: the electronic communication associated with an unstructured data element generated by an application disparate from the enterprise application;
   identify a structured data element comprising a business object having a multi-layered encapsulated hierarchical structure, the structured data element associated with an active process of the enterprise application comprising at least one of a background process running in the enterprise application when the electronic communication was generated or a process loaded into the enterprise application that was active when the electronic communication was generated;
   create a link between the unstructured data element and the structured data element, the link created at least partially based on one or more attributes of the electronic communication and the active process of the enterprise application, the link created upon instigation of the electronic communication by the user, the attributes comprising a recipient of the electronic communication and a role of the user in the active process; and store the link in a link repository.

2. The Non-transitory computer readable storage medium of claim 1, the link repository comprising at least one link index and the link index comprising a plurality of links.

3. The Non-transitory computer readable storage medium of claim 1 further operable to:
query the link repository to identify a subset of links associated with a query term, the query term comprising one of:
a business entity; a supplier; a customer; a product; and a product component; and present the subset of queried links to the user.

4. The Non-transitory computer readable storage medium of claim 3 further operable to present the subset of queried links to the user via the enterprise application.

5. The Non-transitory computer readable storage medium of claim 1, the business object related to a business entity and the unstructured data element comprising at least one of: the electronic communication; and an electronic document associated with the electronic communication.

6. The Non-transitory computer readable storage medium of claim 1, the software comprising a client agent that identifies the electronic communication by monitoring the active process, the active process comprising one or more client-side processes.

7. The Non-transitory computer readable storage medium of claim 1, the electronic communication comprising at least one of:
an electronic mail communication;
an electronically logged physical communication; a text message communication; and an instant message communication.

8. The Non-transitory computer readable storage medium of claim 1, the one or more electronic communication attributes comprising at least one of:
a date of the electronic communication;
a subject of the electronic communication;
a content of the electronic communication; and
a recipient of the electronic communication; and
the active process comprising at least one of: a procurement process; a complaint process; a scheduling process; a database module; and a sales process.

9. A system for managing structured and unstructured data, comprising:
at least one memory, the memory storing:
a data link module;
at least one data link policy; and
at least a portion of an enterprise application; and
one or more processors adapted to execute the data link module such that the data link module is operable to:
identify an electronic communication from a user in the enterprise application, the electronic communication associated with an unstructured data element generated by an application disparate from the enterprise application;
identify a structured data element comprising a business object having a multi-layered encapsulated hierarchical structure, the structured data element associated with an active process of the enterprise application comprising at least one of a background process running in the enterprise application when the electronic communication was generated or a process loaded into the enterprise application that was active when the electronic communication was generated;
create a link between the unstructured data element and the structured data element, the link created at least partially based on one or more attributes of the electronic communication and the active process of the enterprise application, the link created upon instigation of the electronic communication by the user, the attributes comprising a recipient of the electronic communication and a role of the user in the active process; and
store the link in a link repository, the link repository at least partially stored in the memory.

10. The system of claim 9, the data link module further operable to:
identify a second electronic communication from the user in the enterprise application; and
prohibit creation of a link between a second unstructured data element associated with the second electronic communication and a second structured data element associated with the enterprise application based on a link policy.

11. The system of claim 10, the link policy comprising:
a sensitivity of at least one of the second structured data element or the second unstructured data element;
a relevance of at least one of the second structured data element or the second unstructured data element;
a user role; and
the active process of the enterprise application.

12. The system of claim 9, the unstructured data element comprising at least one of:
the electronic communication; and
an electronic document associated with the electronic communication.

13. The system of claim 9, the electronic communication comprising at least one of:
an electronic mail communication;
an electronically logged physical communication;
a text message communication; and
an instant message communication; and
the attribute of the electronic communication comprising at least one of:
a date of the electronic communication;
a subject of the electronic communication; and
a recipient of the electronic communication.

14. A computer-implemented method for managing structured and unstructured data, the method comprising:
identifying an electronic communication associated with a user in an enterprise application, the electronic communication associated with an unstructured data element generated by an application disparate from the enterprise application;
identifying a structured data element comprising a business object having a multi-layered encapsulated hierarchical structure, the structured data element associated with an active process of the enterprise application comprising at least one of a background process running in the enterprise application when the electronic communication was generated or a process loaded into the enterprise application that was active when the electronic communication was generated;
creating a link between the unstructured data element and the structured data element, the link created at least partially based on one or more attributes of the electronic communication and the active process of the enterprise application, the link created upon instigation of the electronic communication by the user, the attributes comprising a recipient of the electronic communication and a role of the user in the active process; and
storing the link in a link repository.

15. The method of claim 14, the link repository comprising at least one link index and the link index comprising a plurality of links.

16. The method of claim 14 further comprising:
receiving a query of the link repository to identify a subset of links associated with a query term; and
presenting the subset of queried links to the user.

17. The method of claim 14, wherein the business object relates to a business entity and the unstructured data element comprises at least one of:
the electronic communication; or
an electronic document associated with the electronic communication.

18. The method of claim 14, wherein the electronic communication comprises at least one of:
an electronic mail communication;
an electronically logged physical communication;
a text message communication; or
an instant message communication.

* * * * *